United States Patent
Kokubo et al.

(10) Patent No.: US 9,546,577 B2
(45) Date of Patent: Jan. 17, 2017

(54) VALVE TIMING CONTROL APPARATUS

(75) Inventors: Satoshi Kokubo, Aichi-gun (JP); Masahiro Yoshida, Chita-gun (JP); Yuuki Ohta, Okazaki (JP); Masaaki Kaneko, Nukata-gun (JP)

(73) Assignee: AISIN SEIKI KABUSHIKI KAISHA, Kariya-shi, Aichi-ken (JP)

( * ) Notice: Subject to any disclaimer, the term of this patent is extended or adjusted under 35 U.S.C. 154(b) by 1101 days.

(21) Appl. No.: 13/032,138

(22) Filed: Feb. 22, 2011

(65) Prior Publication Data

US 2011/0232595 A1 Sep. 29, 2011

(30) Foreign Application Priority Data

Mar. 26, 2010 (JP) .................................. 2010-073793

(51) Int. Cl.
*B60T 7/12* (2006.01)
*G05D 1/00* (2006.01)
(Continued)

(52) U.S. Cl.
CPC ......... *F01L 1/3442* (2013.01); *F02D 13/0219* (2013.01); *F01L 2001/3443* (2013.01);
(Continued)

(58) Field of Classification Search
CPC .... Y02T 10/18; Y02T 10/42; F02D 2041/001; F02D 41/0002; F01L 1/3442
(Continued)

(56) References Cited

U.S. PATENT DOCUMENTS 6,244,230 B1  6/2001  Mikame
7,063,057 B1  6/2006  Waters et al.
(Continued)

FOREIGN PATENT DOCUMENTS

CN  101611221 A  12/2009
EP  0 937 865 A1  8/1999
(Continued)

OTHER PUBLICATIONS

Extended European Search Report issued Dec. 14, 2012, by the European Patent Office in corresponding European Patent Application No. 11155875.5. (6 pages).
(Continued)

*Primary Examiner* — Sizo Vilakazi
(74) *Attorney, Agent, or Firm* — Buchanan Ingersoll & Rooney PC

(57) ABSTRACT

A valve timing control apparatus includes a driving-side rotating member, a driven-side rotating member, a fluid pressure chamber defined by the driving-side rotating member and the driven-side rotating member and divided into a retarded angle chamber and an advanced angle chamber by a parting portion, an angle detecting portion detecting a relative angle of the driven-side rotating member relative to the driving-side rotating member, a fluid control mechanism controlling a supply and a discharge of an operation fluid to and from the fluid pressure chamber, an acceleration operation quantity detecting mechanism detecting an acceleration operation quantity, and a control portion setting either a normal drive mode or an acceleration drive mode as a control mode relative to the fluid control mechanism based on the acceleration operation quantity, and controlling the fluid control mechanism so that the relative angle corresponds to a target angle determined based on the set control mode.

9 Claims, 10 Drawing Sheets

(51) Int. Cl.
*G06F 7/00* (2006.01)
*G06F 17/00* (2006.01)
*F01L 1/344* (2006.01)
*F02D 13/02* (2006.01)

(52) U.S. Cl.
CPC ............ *F01L 2001/34426* (2013.01); *F01L 2001/34453* (2013.01); *F01L 2001/34459* (2013.01); *F01L 2001/34473* (2013.01); *Y02T 10/18* (2013.01)

(58) Field of Classification Search
USPC ........... 123/90.15, 90.16, 90.17, 90.18, 345, 346,123/347, 348; 701/102, 103, 110
See application file for complete search history.

(56) References Cited

U.S. PATENT DOCUMENTS

| | | | |
|---|---|---|---|
| 2003/0005900 A1* | 1/2003 | Katayama | F01L 1/26 123/90.17 |
| 2005/0022761 A1* | 2/2005 | Asami | F01L 1/181 123/90.16 |
| 2006/0037568 A1 | 2/2006 | Arinaga et al. | |
| 2006/0124091 A1* | 6/2006 | Shikata | F01L 1/344 123/90.15 |
| 2008/0228377 A1* | 9/2008 | Hosokawa | F02D 41/0002 701/103 |
| 2009/0228187 A1* | 9/2009 | Nakamura | F01L 1/022 701/103 |
| 2010/0071660 A1 | 3/2010 | Hoshi et al. | |

FOREIGN PATENT DOCUMENTS

| | | |
|---|---|---|
| EP | 1 630 365 A1 | 3/2006 |
| JP | 60-190610 A | 9/1985 |
| JP | 07-139380 A | 5/1995 |
| JP | 08-170550 A | 7/1996 |
| JP | 2001-329871 A | 11/2001 |
| JP | 2003-328707 A | 11/2003 |
| JP | 2005-249078 A | 9/2005 |
| JP | 2009-085139 A | 4/2009 |

OTHER PUBLICATIONS

Office Action (Reason) issued on Oct. 31, 2013, by the Japanese Patent Office in corresponding Japanese Patent Application No. 2010-073793, and an English Translation of the Office Action. (5 pages).
First Office Action issued by the Chinese Patent Office in the Chinese counterpart Patent Application No. 201110065330.5, dated May 4, 2014 and English translation of the First Office Action. (17 pages).

* cited by examiner

Most retarded angle phase

Most advanced angle phase

VALVE TIMING CONTROL APPARATUS

CROSS REFERENCE TO RELATED APPLICATIONS

This application is based on and claims priority under 35 U.S.C. §119 to Japanese Patent Application 2010-073793, filed on Mar. 26, 2010, the entire content of which is incorporated herein by reference.

TECHNICAL FIELD

This disclosure relates to a valve timing control apparatus.

BACKGROUND DISCUSSION

Generally, a valve timing control apparatus is configured so that a relative angle of a driven-side rotating member is changed in a manner where a fluid control mechanism is controlled so that an amount of an operation fluid within a retarded angle chamber and an advanced angle chamber is changed. Accordingly, an opening and closing timing of a valve is adjusted, so that an amount of air suitable to a driving condition is suppliable/dischargeable relative to an internal combustion engine.

For example, a valve timing control apparatus disclosed in JPH07-139380A includes a variable valve timing mechanism, a driving state detecting means, a valve timing determining means, a driving control means and a driving speed condition determining means. The variable valve timing mechanism is torsionally driven in order to continuously vary an opening and closing timing of at least one of an intake valve and an exhaust valve. The driving state detecting means detects a driving state of an internal combustion engine. The valve timing determining means determines a valve timing target value on the basis of a detection result of the driving state detecting means. The driving control means controls an actuation of the variable valve timing mechanism on the basis of the valve timing target value in order to control the opening and closing timing of at least one of the intake valve and the exhaust valve. The driving speed condition determining means determines whether or not a speed should be changed on the basis of a detection result of the driving state detecting means. Furthermore, the driving control means is configured so as to stop the control of the valve timing to correspond to the valve timing target value in response to the driving state during a period of time from when a speed shift is started until the speed shift is ended on the basis of a detection result of the driving speed condition determining means. Still further, the driving control means is configured so as to execute a control of the internal combustion engine on the basis of a maximum cam phase target value, which is set in an operation state at a point of time when the speed shift is completed, in a direction reverse to a direction where the variable valve timing mechanism is moved by a cam rotational torque as a target value.

According to the valve timing control apparatus of the internal combustion engine disclosed in JPH07-139380A, the control is executed on the basis of the maximum cam phase target value in the direction reverse to the direction in which the variable valve timing mechanism is moved in response to the cam rotational torque upon the driving condition when the speed shift is completed, instead of the target value corresponding to the driving condition, during the period of time when the speed shift is started until the speed shift is completed. Accordingly, a responsiveness of the valve timing control apparatus while the shift speed is changed may be increased.

A control apparatus for a variable valve mechanism disclosed in JP2009-085139A includes a variable valve mechanism, a target value calculating means, a reference response value calculating means, a feedforward control amount calculating means, a feedback control amount calculating means, and an operation amount calculating means. The variable valve mechanism is configured so as to change a valve opening characteristic of an engine valve. The target value calculating means calculates a target value of the variable valve mechanism corresponding to a target value of the valve opening characteristic of the engine valve. The reference response value calculating means calculates a reference response value in a case where the variable valve mechanism is actuated in response to a reference response characteristic. The feedforward control amount calculating means calculates a feedforward control amount for responding the variable valve mechanism on the basis of the reference response characteristic. The feedback control amount calculating means calculates a feedback control amount for eliminating a deviation between the reference response value of the variable valve mechanism and an actual response value thereof. The operation amount calculating means calculates an operation amount outputted to a driving means of the variable valve mechanism on the basis of the feedforward control amount and the feedback control amount. Furthermore, the variable valve mechanism disclosed in JP2009-085139A includes a deviation calculating means for calculating the deviation between the target value of the variable valve mechanism and the reference response value thereof, and an integration calculation terminating means for terminating a calculation using an integral element when the feedback control amount is calculated, in a case where the deviation between the target value of the variable valve mechanism and the reference response value thereof is equal to or greater than a predetermined value.

According to the variable valve mechanism disclosed in JP2009-085139A, the calculation using the integral element when the feedback control amount is calculated is terminated when the deviation between the target value of the variable valve mechanism and the reference response value thereof becomes equal to or greater than the predetermined value. Accordingly, an overshoot occurring as a result of an integral value becoming excessive may be avoided, so that the reference response value is smoothly converged into (corresponds to) the target value.

According to the valve timing control apparatus of the internal combustion engine disclosed in JPH07-139380A and the variable valve mechanism disclosed in JP2009-085139A, the opening and closing timing of the valve under a normal driving condition may be appropriately controlled. However, a control to be executed when a vehicle is suddenly accelerated is not considered. Therefore, even if the control disclosed in JPH07-139380A and JP2009-085139A is adapted in the case where the vehicle is suddenly accelerated, a sufficient acceleration performance may not be achieved.

A need thus exists to provide a valve timing control apparatus which is not susceptible to the drawback mentioned above.

SUMMARY

According to an aspect of this disclosure, a valve timing control apparatus includes a driving-side rotating member synchronously rotated relative to a crankshaft of an internal combustion engine, a driven-side rotating member arranged in a coaxial manner relative to the driving-side rotating member and synchronously rotated together with a camshaft for opening and closing a valve of the internal combustion engine, a fluid pressure chamber defined by the driving-side rotating member and the driven-side rotating member and divided into a retarded angle chamber and an advanced angle chamber by means of a parting portion provided at least one of the driving-side rotating member and the driven-side rotating member, an angle detecting portion detecting a relative angle, which corresponds to a relative phase of the driven-side rotating member relative to the driving-side rotating member, a fluid control mechanism controlling a supply of an operation fluid from a pump, which supplies the operation fluid, to the fluid pressure chamber and a discharge of the operation oil from the fluid pressure chamber, an acceleration operation quantity detecting mechanism detecting an acceleration operation quantity, which corresponds to an operation quantity applied to an acceleration pedal, and a control portion setting either one of a normal drive mode and an acceleration drive mode as a control mode relative to the fluid control mechanism on the basis of the acceleration operation quantity, and controlling the fluid control mechanism so that the relative angle corresponds to a target angle, which is set as a target value of the relative angle determined on the basis of the acceleration operation quantity in the set control mode.

According to another aspect of this disclosure, a valve timing control apparatus includes a driving-side rotating member synchronously rotated relative to a crankshaft of an internal combustion engine, a driven-side rotating member arranged in a coaxial manner relative to the driving-side rotating member and synchronously rotated together with a camshaft for opening and closing a valve of the internal combustion engine, an angle detecting portion detecting a relative angle, which corresponds to a relative phase of the driven-side rotating member relative to the driving-side rotating member, an acceleration operation quantity detecting mechanism detecting an acceleration operation quantity, which corresponds to an operation quantity applied to an acceleration pedal, and a control portion setting either one of a normal drive mode and an acceleration drive mode, each of which store therein different control information, as a control mode based on which the relative angle is controlled in response to the acceleration operation quantity, and shifting the relative angle on the basis of the control information corresponding to the either one of the normal drive mode and the acceleration drive mode, which is set as the control mode.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Figure 1:
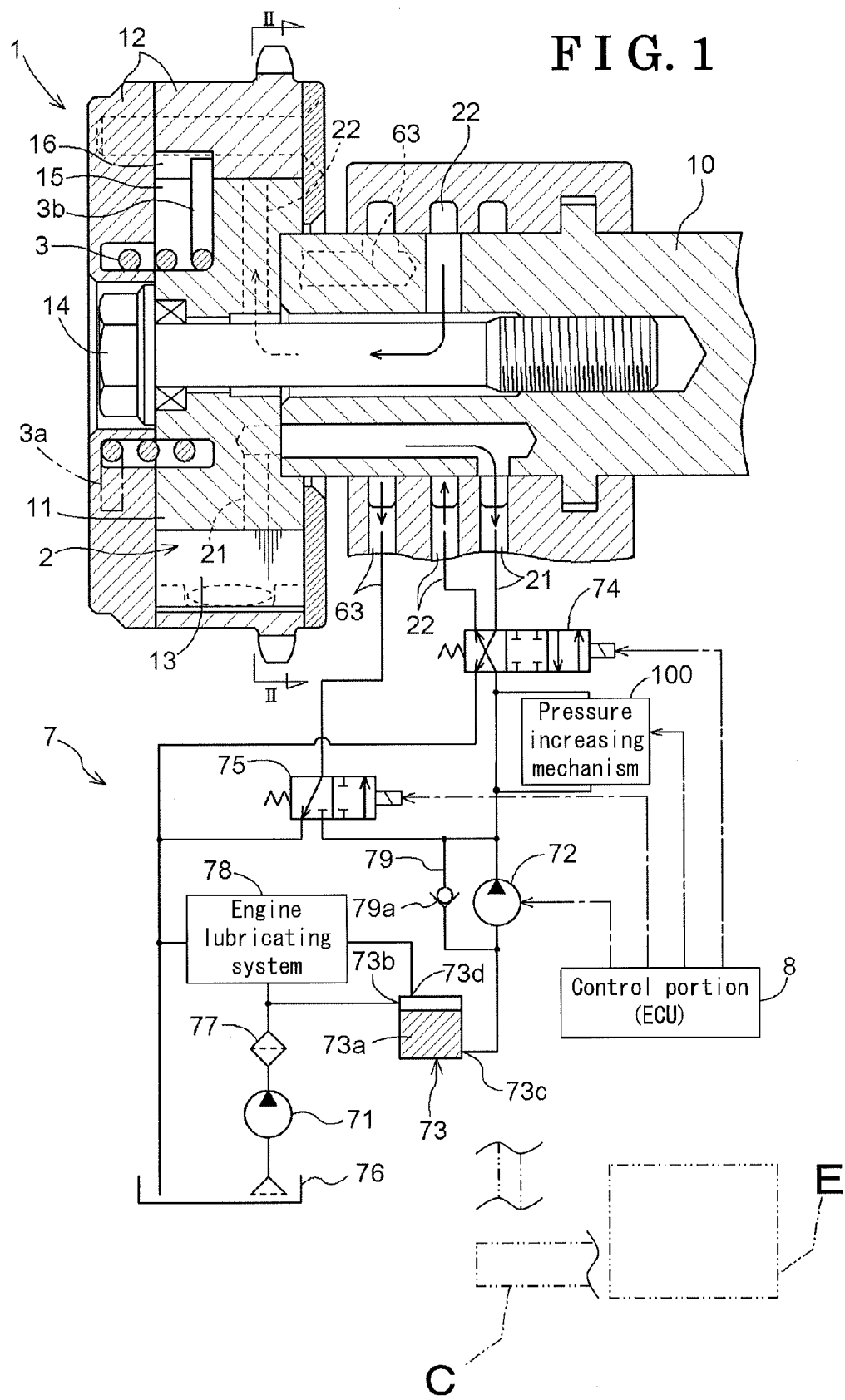
FIG. 1 is a broken-out section view illustrating an entire configuration of a valve timing control apparatus according to an embodiment.
Figure 2:
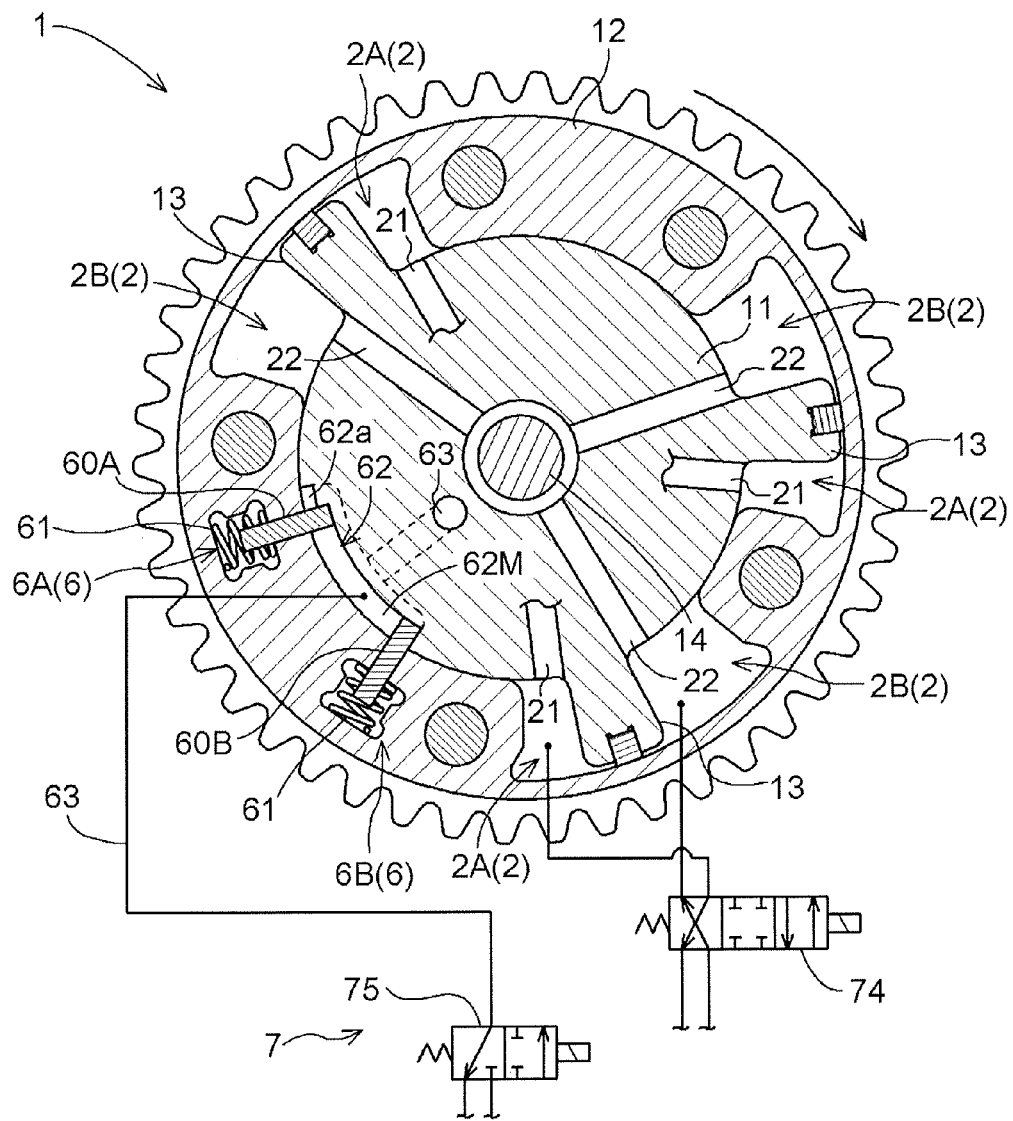
FIG. 2 is a cross-sectional diagram illustrating one operation state of the valve timing control apparatus taken along line II-II in FIG. 1.

An embodiment of a valve timing control apparatus will be described below with reference to the attached drawings. Illustrated in FIG. 1 is a cross-sectional diagram schematically illustrating a configuration example of the valve timing control apparatus according to the embodiment. Illustrated in FIG. 2 is a cross-sectional diagram of the valve timing control apparatus taken along line II-II in FIG. 1. Furthermore, the cross-sectional diagram in FIG. 2 is a plane diagram schematically illustrating a state of a phase shifting mechanism 1 in one operation state. The phase shifting mechanism 1 includes a driven-side rotating member 11 and a driving-side rotating member 12. The driving-side rotating member 12 is synchronously rotated together with a crankshaft C of an engine E (an internal combustion engine). The driven-side rotating member 11 is arranged in a coaxial manner relative to the driving-side rotating member 12. Furthermore, the driven-side rotating member 11 is synchronously rotated together with a camshaft 10 for opening and closing a valve of the internal combustion engine E. In this embodiment, the driven-side rotating member 11 is arranged radially inwardly of the driving-side rotating member 12. Furthermore, a sprocket is adapted as the driving-side rotating member 12. However, the driving-side rotating member 12 may be configured with a pulley and the like. A rotational force generated by the engine E is transmitted from the crankshaft C to the driving-side rotating member 12 via a transmission mechanism such as a belt, a chain and the like. The driven-side rotating member 11 is fixed at the camshaft 10 by means of a bolt 14 (bolts 14). Accordingly, when the driven-side rotating member 11 and the driving-side rotating member 12 are rotated in conjunction with each other, the camshaft 10 is rotated, so that an inlet valve or an exhaust valve of the engine E is actuated to be opened and closed.

As illustrated in FIG. 2, a space 2 (i.e. an example of a fluid pressure chamber) is defined by the driven-side rotating member 11 and the driving-side rotating member 12. In this embodiment, three spaces 2 are formed between the driven-side rotating member 11 and the driving-side rotating member 12. Each space 2 is divided into a first pressure chamber 2A and a second pressure chamber 2B by means of a vane 13 (i.e. an example of a parting portion), which is configured as a movable partition. A volume of each space 2 is invariable. Hence, a volume of the first pressure chamber 2A and a volume of the second pressure chamber 2B are changed in a complementary manner when a position of the vane 13 changes within the corresponding space 2. When the volumes of the first pressure chambers 2A and the second pressure chambers 2B change, a relative phase (which will be hereinafter referred to as a relative angle) of the driven-side rotating member 11 relative to the driving-side rotating member 12 is changed. Accordingly, an opening and closing timing of the inlet valve or the exhaust valve of the engine E, whose piston reciprocates, is changed in response to changes in the relative angle. Additionally, the partition for dividing each space 2 into the first pressure chamber 2A and the second pressure chamber 2B is not limited to the block-shaped vane 13 as illustrated in FIG. 2. For example, a plate-shaped vane may be adapted as the vane 13. Furthermore, in this embodiment, the spaces 2 are formed as recessed portions of the driving-side rotating member 12 and the vanes 13 are formed at the driven-side rotating member 11. However, the spaces 2 may be formed as recessed portions of the driven-side rotating member 11 and the vanes 13 may be formed at the driving-side rotating member 12.

In this embodiment, the entire phase shifting mechanism 1 is rotated in a clockwise direction. Illustrated in FIG. 2 is the valve timing control apparatus where an intermediate lock phase, which is set as the relative angle suitable for starting the internal combustion engine E, is formed. The intermediate lock phase is set as an intermediate region between a most retarded angle phase state, where the relative angle of the driven-side rotating member 11 relative to the driving-side rotating member 12 is most retarded, and a most advanced angle phase state, where the relative angle of the driven-side rotating member 11 relative to the driving-side rotating member 12 is most advanced. Furthermore, the valve timing control apparatus is configured so as to be retained at the intermediate lock phase by means of a lock mechanism 6.

When the lock mechanism 6 is unlocked from the state illustrated in FIG. 2, an engine oil (i.e. an example of an operation fluid) is supplied to the first pressure chambers 2A and the engine oil is discharged from the second pressure chambers 2B, the relative volume of the first pressure chambers 2A relative to the second pressure chambers 2B increases. Accordingly, the relative angle of the driven-side rotating member 11 is shifted towards a retarded angle phase. On the other hand, in a case where the engine oil is supplied to the second pressure chambers 2B and the engine oil is discharged from the first pressure chambers 2A, a phase of the driven-side rotating member 11 is shifted towards an advanced angle phase. Accordingly, hereinafter, the first pressure chambers 2A are referred to as retarded angle chambers 2A and the second pressure chambers 2B are referred to as advanced angle chambers 2B. Furthermore, passages connected to the respective retarded angle chambers 2A (see FIG. 1) are referred to as retarded angle passages 21, and passages connected to the respective advanced angle chambers 2B (see FIG. 1) are referred to as advanced angle passages 22. Additionally, the retarded angle chambers 2A and the advanced angle chambers 2B are not completely fluid-tightly sealed. Therefore, when an amount of the engine oil is supplied so as to exceed the volumes of the retarded angle chambers 2A and the advance angle chambers 2B, the engine oil leaks to an outside of the phase shifting mechanism 1. The leaked engine oil is collected together with the engine oil supplied to each component of the engine E.

As illustrated in FIG. 2, the lock mechanism 6 includes a retarded angle lock portion 6A, an advanced angle lock portion 6B and a lock recessed portion 62. The retarded angle lock portion 6A and the advanced angle lock portion 6B are formed at the driving-side rotating member 12. On the other hand, the lock recessed portion 62 is formed at a portion of a most outer circumferential surface of the driven-side rotating member 11. The retarded angle lock portion 6A and the advanced angle lock portion 6B are configured so as to restrict a displacement of the relative angle towards the retarded angle phase and the advanced angle phase, respectively. Furthermore, the retarded angle lock portion 6A and the advanced angle lock portion 6B include a first lock piece 60A and a second lock piece 60B, which are supported on the driving-side rotating member 12 so as to be slidably displaceable in a radial direction thereof, respectively. Still further, each of the retarded angle lock portion 6A and the advanced angle lock portion 6B includes a spring 61, which biases each of the first lock piece 60A and the second lock piece 60B to protrude in a radially inward direction. The lock recessed portion 62 is formed at the portion of the most outer circumferential surface of the driven-side rotating member 11 so as to extend in a circumferential direction thereof. Furthermore, the lock recessed portion 62 is formed as a stepped-shape groove having an engagement groove 62M and a restriction auxiliary engagement groove 62a. The engagement groove 62M is formed so as to perform a known lock function in a manner where the first lock piece 60A and the second lock piece 60B are engaged with the engagement groove 62M. The restriction auxiliary engagement groove 62a is formed so that an engagement depth thereof in the radial direction, where the first lock piece 60A engages, is shallower than an engagement depth of the engagement groove 62M. As illustrated in FIG. 2, the restriction auxiliary engagement groove 62a is formed so as to extend towards the advanced angle chamber 2B from an end portion of the engagement groove 62M positioned closer to the advanced angle chamber 2B. Additionally, each of the first and second lock pieces 60A and 60B may be formed in a plate-shape, a pin-shape and the like.

The retarded angle lock portion 6A is configured so that the retarded angle lock piece 60A is engageable with the engagement groove 62M in order to avoid the displacement of the driven-side rotating member 11 towards the retarded angle phase from the intermediate lock phase. On the other hand, the advanced angle lock portion 6B is configured so that the advanced angle lock piece 60B is engageable with the lock recessed portion 62 in order to avoid the displacement of the driven-side rotating member 11 towards the advanced angle phase from the intermediate lock phase.

A width of the engagement grooves 62M, whose depth is deeper than the restriction auxiliary engagement groove 62a, is formed to substantially correspond to a distance between a side surface of the retarded angle lock piece 60A and a side surface of the advanced angle lock piece 60B, which face opposite to each other and which are spaced away from each other in the circumferential direction of the driven-side rotating member 11. Therefore, as illustrated in FIG. 2, in a case where the retarded angle lock piece 60A and the advanced angle lock piece 60B are simultaneously engaged with the engagement groove 62M, the relative angle of the driven-side rotating member 11 is locked at the intermediate lock phase substantively having no allowance width (i.e. a displacement allowance width in the circumferential direction), in other words, the phase shifting mechanism 1 is turned to be in a locked state.

The lock recessed portion 62 is in communication with a lock passage 63, which is formed at the driven-side rotating member 11. The lock passage 63 is further connected to a second control valve 75 of a hydraulic circuit 7. In a case where the engine oil is supplied to the lock recessed portion 62 from the second control valve 75 via the lock passage 63, the pair of the first and second lock pieces 60A and 60B, which are engaged with the lock recessed portion 62, retract towards the driving-side rotating member 12 until end portions of the respective first and second lock pieces 60A and 60B are positioned slightly radially outwardly of the most outer circumferential surface of the driven-side rotating member 11. Accordingly, the locked state established between the driven-side rotating member 11 and the driving-side rotating member 12 is released, so that the relative phase becomes shiftable.

As illustrated in FIG. 1, the hydraulic circuit 7 includes a first pump 71, a second pump 72 and a reservoir 73. The first pump 71 is configured so as to be actuated by the engine E in order to supply the engine oil. The second pump 72 is arranged at a downstream side of a flow of the engine oil relative to the first pump 71. The reservoir 73 is provided between the first pump 71 and the second pump 72 and is configured so as to reserve the engine oil.

The first pump 71 is configured as a mechanical hydraulic pump, which is actuated in response to a driving force generated at the crankshaft C of the engine E. The first pump 71 sucks the engine oil stored at an oil pan 76 from an inlet port and discharges the engine oil to the downstream side from an outlet port. The outlet port of the first pump 71 is in communication with an engine lubricating system 78 and the reservoir 73 via a filter 77. Additionally, the engine lubricating system 78 includes the engine E and all surrounding components, which need the supply of the engine oil.

The second pump 72 is an electric pump, which is actuated by a power differing from the engine E, e.g. an electric motor and the like. Therefore, the second pump 72 is configured so as to be actuatable in response to an actuation signal outputted from a control portion 8 independently of (without being influenced by) an operation state of the engine E. Furthermore, the second pump 72 is configured so as to suck the engine oil reserved at the reservoir 73 from an inlet port and discharge the engine oil to the downstream side from an outlet port. The outlet port of the second pump 72 is in communication with a first control valve 74 and the second control valve 75. Furthermore, the hydraulic circuit 7 includes a bypass passage 79, which is arranged so as to be in parallel with the second pump 72 and which connects an upper stream passage relative to the second pump 72 and a downstream passage relative to the second pump 72. A check valve 79a is provided at the bypass passage 79.

The reservoir 73 is provided between the first pump 71 and the second pump 72. The reservoir 73 includes a storage chamber 73a, which is configured so as to store a predetermined amount of the engine oil. Furthermore, the reservoir 73 includes a first connection port 73b, which establishes a communication between the storage chamber 73a with a downstream passage of the first pump 71, a second connection port 73c, which is provided at a position lower than the first connection port 73b and which establishes a communication between the storage chamber 73a with an upper stream passage of the second pump 72, and a lubricating system connection port 73d, which is provided at a position higher than the first connection port 73b and which establishes a communication between the storage chamber 73a with the engine lubricating system 78.

While the engine E is in a stopped state, in other words, while the first pump 71 is in a stopped state, the second pump 72 supplies the engine oil to the spaces 2 and the lock mechanism 6. Therefore, a volume of the storage chamber 73a of the reservoir 73 is set so that a volume of the storage chamber 73a between the first connection port 73b and the second connection port 73c becomes equal to or greater than a sum of a volume of the spaces 2, the lock recessed portion 62 of the lock mechanism 6 and passages between the second pump 72 on the one hand and the spaces 2 and the lock recessed portion 62 on the other hand. Accordingly, even if the first pump 1 is in the stopped state, the relative angle of the driven-side rotating member 11 may be displaced to a target relative angle by the second pump 72.

The hydraulic circuit 7 further includes the first control valve 74 (i.e. an example of a fluid control mechanism), which is configured so as to control the supply of the engine oil to the spaces 2, and the second control valve 75, which is configured so as to control the supply of the engine oil to the lock mechanism 6. Still further, the hydraulic circuit 7 includes the control portion 8, which is configured so as to control an actuation of the second pump 72, the first control valve 74 and the second control valve 75. In this embodiment, the control portion 8 is configured with an electronic control unit (ECU) as a core.

For example, a variable electromagnetic spool valve, which is configured so as to displace a spool arranged within a sleeve while being allowed to be slidably movable therewithin against a spring in response to an electrification of a solenoid by the control portion 8, may be adapted as the first control valve 74. The first control valve 74 includes an advanced angle port, which is in communication with the advanced angle passages 22, a retarded angle port, which is in communication with the retarded angle passages 21, a supply port, which is in communication with a passage positioned at the downstream side relative to the second pump 72, and a drain port, which is in communication with the oil pan 76. The first control valve 74 is configured as a three position control valve, so that a state of the first control valve 74 is controlled between an advanced angle control portion, by which the advanced angle port and the supply port become in communication and the retarded angle port and the drain port become in communication, a retarded angle control position, by which the retarded angle port and the supply port become in communication and the advanced angle port and the drain port become in communication, and a hold control position, by which the advanced angle port and the retarded angle port are closed. Furthermore, the first control valve 74 is configured so as to control the engine oil remaining within the spaces 2 and the relative angle of the driven-side rotating member 11 in a manner where the solenoid is slidably displaced in response to a control signal (a duty output) from the control portion 8. More specifically, in a case where the duty output is zero percent (0%), the control valve 74 is controlled to be at the retarded angle control position. Furthermore, the first control valve 74 is controlled so that a valve position thereof is shifted to the advanced angle control position via the hold control position as the duty output increases.

As is the case with the first control valve 74, the variable electromagnetic spool valve may be adapted as the second control valve 75. The second control valve 75 includes a lock port, which is in communication with the lock passage 63 serving as an operation oil passage of the lock mechanism 6, a supply port, which is in communication with the passage at the downstream side relative to the second pump 72, and a drain port, which is in communication with the oil pan 76. Furthermore, the second control valve 75 is configured as a two position control valve, so that a state of the second control valve 75 is controlled between an unlock control position, by which the lock port and the supply port become in communication, and a lock control position, by which the lock port and the drain port become in communication. The second control valve 75 is controlled and actuated in response to the control signal outputted from the control portion 8 in order to execute a control of the lock mechanism 6. Additionally, the lock passage 63, which connects the second control valve 75 and the lock mechanism 6, is configured separately and independently of passages connecting the advanced angle passages 22 and the retarded angle passages 21 on the one hand and the first control valve 75 on the other hand, so that a supply/discharge control of the operation oil relative to the lock mechanism 6 is executable separately and independently of a supply/discharge control of the operation oil relative to the retarded angle chambers 2A and the advanced angle chambers 2B.

The valve timing control apparatus according to the embodiment further includes a pressure increasing mechanism 100 on a passage arranged in parallel to a passage extending between the second pump 72 and the fluid control mechanism 74 (i.e. the first control valve 74). The pressure increasing mechanism 100 is configured so as to control a hydraulic pressure relative to the engine oil in response to the control signal (the duty output) from the control portion 8. Additionally, an electric pump, an accumulator or the like may be adapted as the pressure increasing mechanism 100.

A torsion spring 3, which serves as a biasing mechanism for applying a biasing force (an assist torque) for biasing the driven-side rotating member 11 in an advanced angle direction, is provided between the driving-side rotating member 12 and the driven-side rotating member 11. Generally, a rotation of the driven-side rotating member 11 tends to delay relative to a rotation of the driving-side rotating member 12 because of a resistance applied to the driven-side rotating member 11 from a valve spring of an intake valve and an exhaust valve, the phase shifting mechanism 1 and the like. Therefore, the torsion spring 3 is configured so as to reduce the delay of the rotation of the driven-side rotating member 11, in other words, the torsion spring 3 is configured so as to restrict a shift of the relative phase towards the retarded angle phase.

Figure 3:
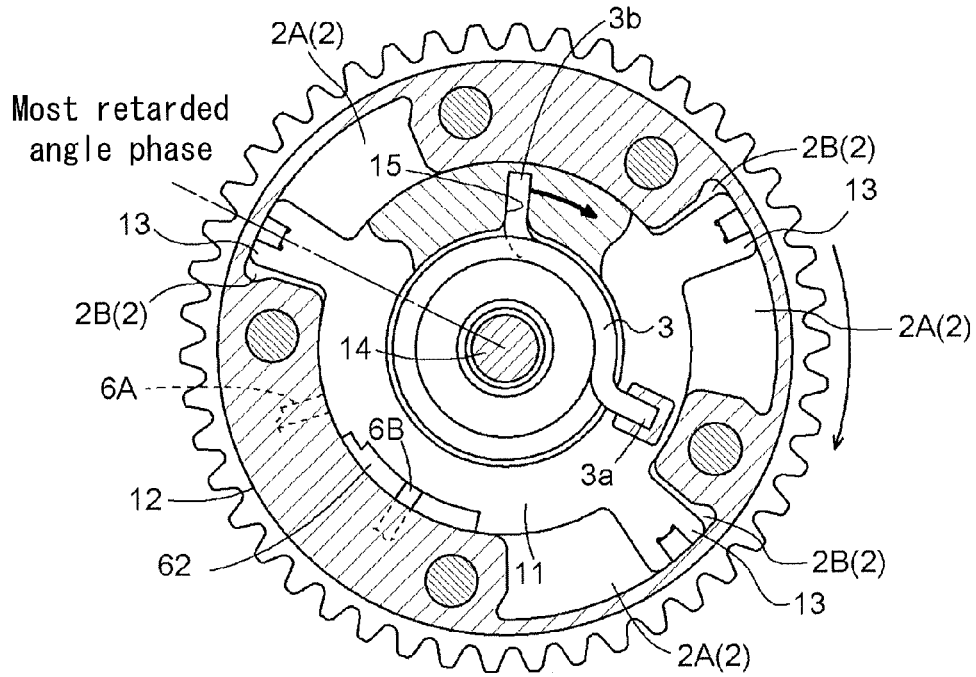
FIG. 3 is a diagram schematically illustrating the valve timing control apparatus when a most retarded angle phase is formed.

As illustrated in FIGS. 1 and 3, the torsion spring 3 includes a first end portion 3a, which is fixed at the driving-side rotating member 12, and a second end portion 3b, which is fixed at an engagement portion 15 formed at the driven-side rotating member 11 so as to extend in the radial direction thereof.

Figure 4:
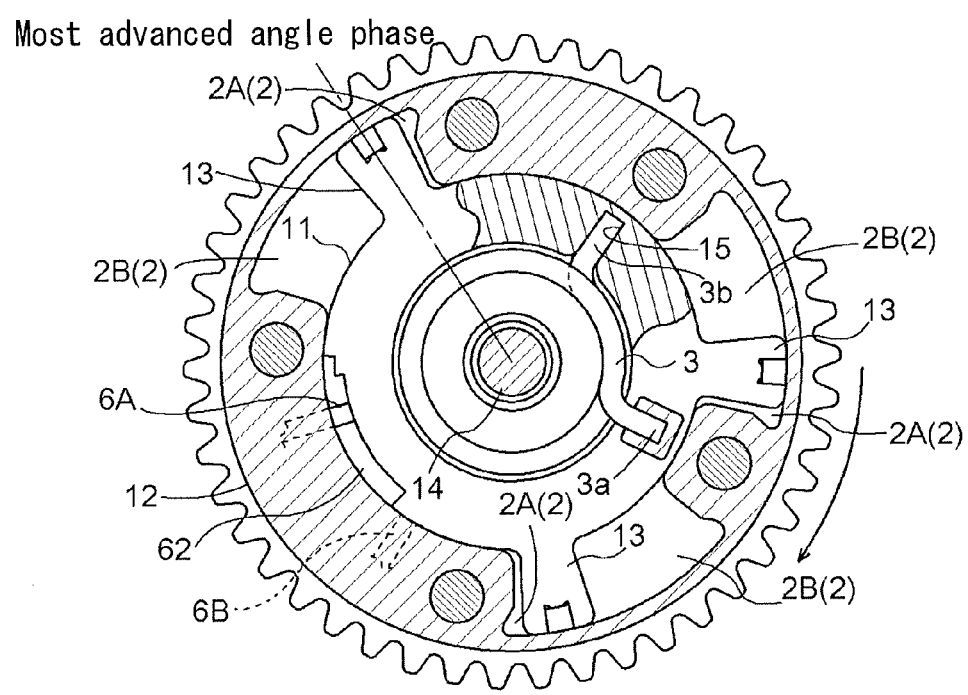
FIG. 4 is a diagram schematically illustrating the valve timing control apparatus when a most advanced angle phase is formed.

Illustrated in FIGS. 3 and 4 are the shift of the relative phase between the driven-side rotating member 11 and the driving-side rotating member 12. More specifically, illustrated in FIG. 3 is a most retarded angle phase formed between the driven-side rotating member 11 and the driving-side rotating member 12 and illustrated in FIG. 4 is a most advanced angle phase formed between the driven-side rotating member 11 and the driving-side rotating member 12. As is shown in FIGS. 3 and 4, the relative phase between the driven-side rotating member 11 and the driving-side rotating member 12 is shifted from the most retarded angle phase to the most advanced angle phase via the intermediate lock phase (see FIG. 2) in response to the rotation of the driven-side rotating member 11 in the clockwise direction relative to the driving-side rotating member 12.

Figure 5:
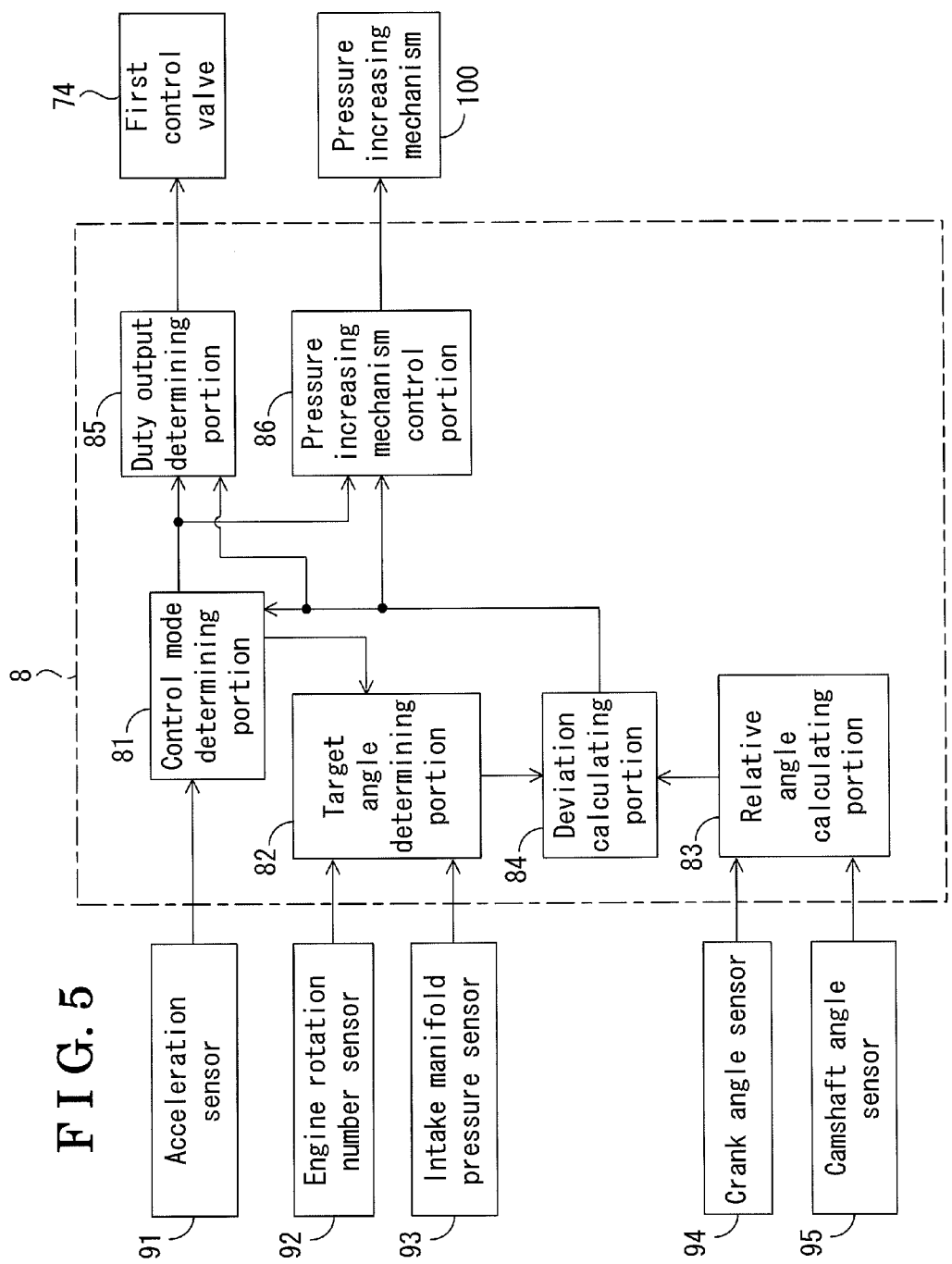
FIG. 5 is a functional block diagram illustrating each functional portion of a control portion.

As illustrated in FIG. 5, the control portion 8 includes a control mode determining portion 81, a target angle determining portion 82, a relative angle calculating portion 83, a deviation calculating portion 84, a duty output determining portion 85, and a pressure increasing mechanism control portion 86, each of which is configured with a software.

The control mode determining portion 81 sets a control mode to either a normal drive mode or an acceleration drive mode on the basis of an acceleration operation quantity (an acceleration operating amount) obtained from an acceleration sensor 91 (which serves as an acceleration operation quantity detecting mechanism). The acceleration sensor 91 is a sensor that measures an operation quantity applied to an acceleration pedal by a driver. The acceleration pedal is directly operated by the driver. Therefore, an intention of the driver whether the driver wishes to accelerate or not may be promptly determined on the basis of the control mode determined based on the operation quantity applied to the acceleration pedal. The determined (set) control mode is transmitted to the target angle determining portion 82, the duty output determining portion 85 and the pressure increasing mechanism control portion 86.

The target angle determining portion 82 determines a target angle, which is set as a target valve of the relative angle of the driven-side rotating member 11. In this embodiment, the target angle is determined in response to the control mode. More specifically, in this embodiment, the target angle is determined on the basis of a map control. Therefore, in this embodiment, the target angle determining portion 82 stores therein a normal mode map, which is used in the case of the normal drive mode, and an acceleration mode map, which is used in the case of the acceleration drive mode. Additionally, the normal drive mode in this embodiment refers to a state where an improvement in fuel consumption is prioritized and the acceleration drive mode in this embodiment refers to a state where an improvement in torque is prioritized. Therefore, a target angle for improving the fuel consumption is set in the normal mode map. On the other hand, a target angle for improving the torque is set in the acceleration mode map.

Furthermore, in this embodiment, a relationship between an engine rotation number (an engine rotational speed), an amount of the intake (exhausted) air and the target angle is defined on each of the normal mode map and the acceleration mode map. In other words, the target angle may be determined on the basis of the engine rotation number and the amount of the intake (exhausted) air. Therefore, a signal from an engine rotation number sensor 92 for measuring the rotation number of the engine E and a signal from an intake manifold pressure sensor 93 for measuring an air pressure of the intake manifold are inputted into the target angle determining portion 82. In this embodiment, the intake manifold pressure sensor 93 is adapted in order to use the air pressure of the intake manifold as a reference of the amount of intake (exhausted) air. However, a sensor for measuring a flow (an amount of flow) of the air flowing within the intake manifold may be adapted instead of the intake manifold pressure sensor 93. The target angle determined by the target angle determining portion 82 is transmitted to the deviation calculating portion 84.

The relative angle calculating portion 83 calculates the relative angle of the driven-side rotating member 11. In this embodiment, a signal from a crank angle sensor 94 for measuring a crank angle and a signal from a camshaft angle sensor 95 for measuring an angle of the camshaft 10 are inputted into the relative angle calculating portion 83. The relative angle calculating portion 83 calculates a current relative angle of the driven-side rotating member 11 on the basis of the crank angle and the camshaft angle measured by the respective crank angle sensor 94 and the camshaft angle sensor 95. The relative angle calculated by the relative angle calculating portion 83 is transmitted to the deviation calculating portion 84. Additionally, in this embodiment, the crank angle sensor 94 and the camshaft angle sensor 95 configure an angle detecting portion.

The deviation calculating portion 84 calculates a deviation between the target angle and the actual relative angle of the driven-side rotating member 11. More specifically, the deviation calculating portion 84 reduces the relative angle of the driven-side rotating member 11 obtained from the relative angle calculating portion 83 from the target angle obtained from the target angle determining portion 82. The deviation calculated by the deviation calculating portion 84 is transmitted to the control mode determining portion 81, the duty output determining portion 85 and the pressure increasing mechanism control portion 86.

The duty output determining portion 85 determines the duty output relative to the fluid control mechanism 74 (i.e. the first control valve 74) on the basis of the deviation between the target angle and the relative angle. In this embodiment, the duty output determining portion 85 determines the duty output on the basis of a proportional-integral-derivative control (a PID control). According to the PID control, the duty output may be determined on the basis of the following formula: (duty output)=(control constant)*(deviation)+(control constant)*(integrated value of deviation)+(control constant)*(derivative value of deviation). As described above, in this embodiment, either one of the normal drive mode and the acceleration drive mode is set as the control mode, so that various control is executed on the basis of the set control mode. In this case, the control constant of the PID control executed by the duty output determining portion 85 may be set as a constant value. In other words a single constant value may be used for the PID control executed by the duty output determining portion 85. However, in a case where the control constant is set as a variable value in response to the control mode, a further suitable and appropriate control may be achieved. Therefore, the duty output determining portion 85 according to this embodiment stores therein a normal mode control constant used in the case of the normal drive mode and an acceleration mode control constant used in the case of the acceleration drive mode, so that either one of the normal mode control constant and the acceleration mode control constant is used in response to the control mode determined by the control mode determining portion 81. The duty output determining portion 85 applies the determined duty output to the fluid control mechanism 74 in order to shift (change, displace) the relative angle of the driven-side rotating member 11.

The pressure increasing mechanism control portion 86 determines a duty output for controlling the pressure increasing mechanism 100 in order to control the pressure increasing mechanism 100. In this embodiment, the pressure increasing mechanism control portion 86 is configured so as to actuate the pressure increasing mechanism 100 in the case where the acceleration drive mode is set as the control mode. Furthermore, after the pressure increasing mechanism 100 is actuated, the pressure increasing mechanism control portion 86 executes a duty control relative to the pressure increasing mechanism 100 based on the PID control in response to the deviation between the actual relative angle of the driven-side rotating member 11 and the target angle. Still further, in a case where a predetermined condition is satisfied, a control for stopping the pressure increasing mechanism 100 is executed by the pressure increasing mechanism control portion 86.

Figure 6:
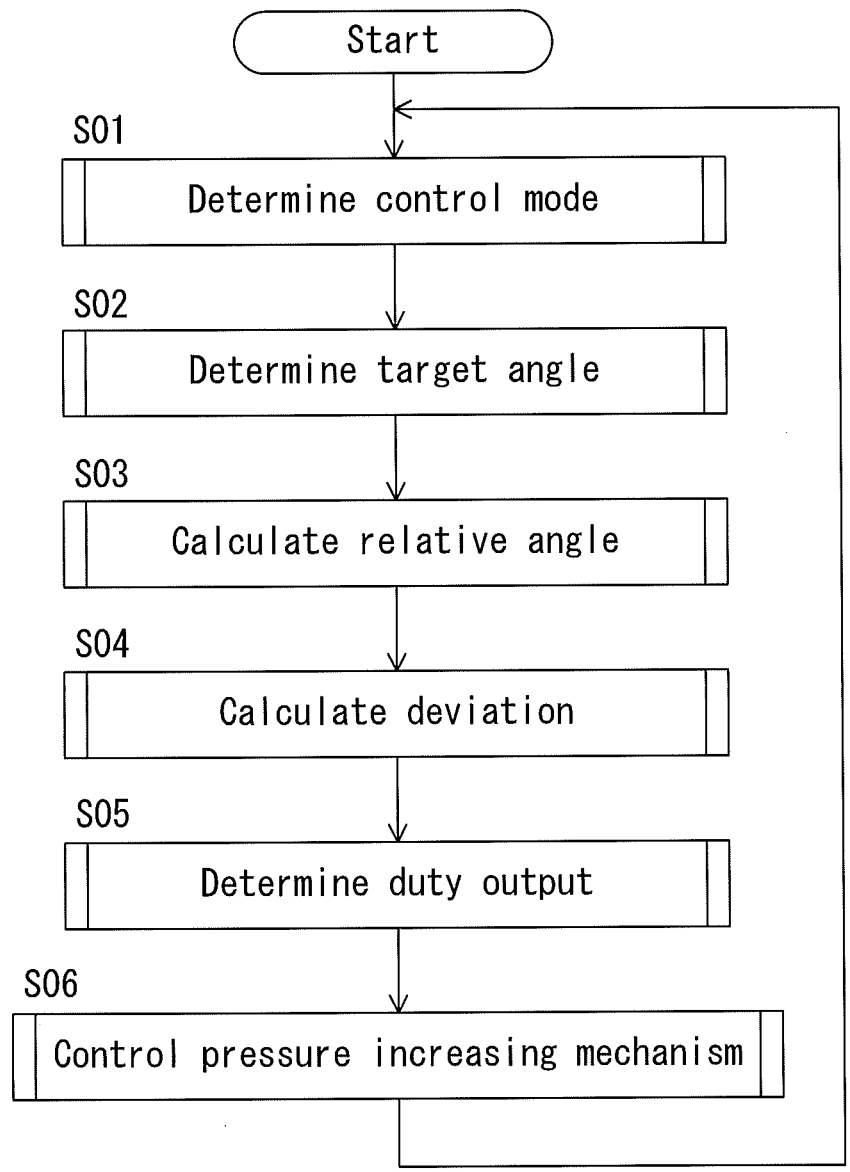
FIG. 6 is a flowchart illustrating a process executed by the valve timing control apparatus.

Illustrated in FIG. 6 is a flowchart of a process executed by the valve timing control apparatus according to the embodiment. In this embodiment, the signals from the acceleration sensor 91, the engine rotation number sensor 92, the intake manifold pressure sensor 93, the crank angle sensor 94 and the camshaft angle sensor 95 are normally inputted into the control portion 8.

The control mode determining portion 81 sets either one of the normal drive mode and the acceleration drive mode as the control mode on the basis of the acceleration operation quantity obtained by the acceleration sensor 91 (step S01). In this embodiment, the control mode is determined on the basis of changes (a changing degree) in the acceleration operation quantity. The acceleration pedal is directly operated by the driver, therefore, the intension of the driver may be appropriately reflected in the acceleration operation quantity. However, a case where the acceleration operation quantity becomes great because a large torque is necessary for travelling on an inclined road and the like may occur. In this case, if the control mode is determined on the basis of the acceleration operation quantity, the control mode may not be suitable for a driving condition of a vehicle. Therefore, in this embodiment, the control mode is determined on the basis of changes (a changing amount) in the acceleration operation quantity per unit time, in other words, a time derivative value of the acceleration operation quantity. In a case where the driver wishes to accelerate a vehicle speed, the driver is likely to depress the acceleration pedal deeply. Therefore, in a case where the time derivative value of the acceleration operation quantity exceeds a predetermined threshold value, the control mode is switched to the acceleration mode.

Furthermore, in this embodiment, in a case where a predetermined condition is satisfied while the acceleration drive mode is set as the control mode, the control mode is switched to the normal drive mode and the pressure increasing mechanism 100 is stopped. The fuel consumption is considered to deteriorate (increase) while the pressure increasing mechanism 100 is actuated. Therefore, in this embodiment, the pressure increasing mechanism 100 is stopped as promptly as possible in order to reduce the deterioration (the increase) of the fuel consumption.

Figure 7:
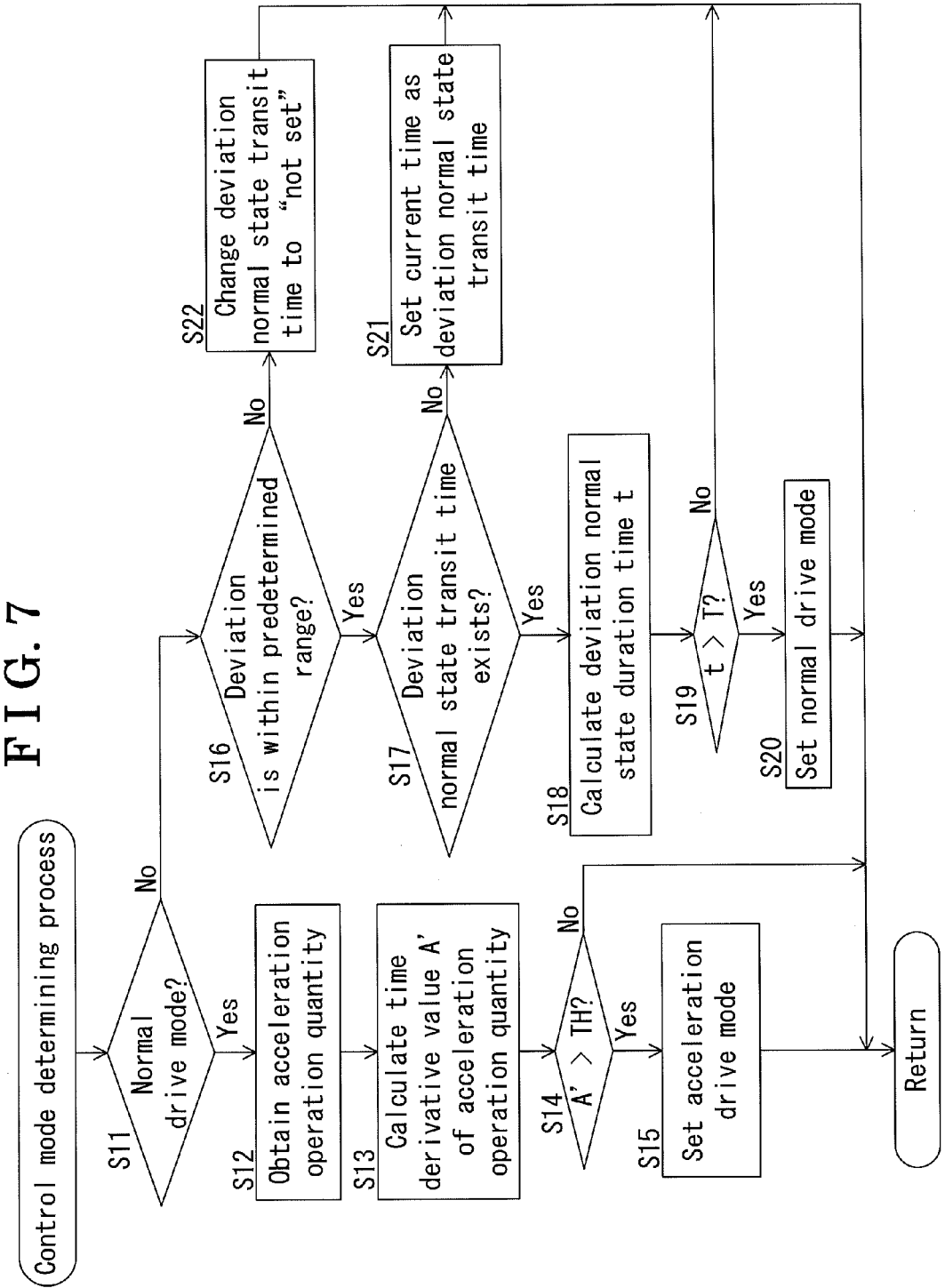
FIG. 7 is a flowchart illustrating a control mode determining process.

Illustrated in FIG. 7 is a flowchart of a determination process of the control mode according to this embodiment. The control mode determining portion 81 is supposed to memorize a most recently (previously) obtained acceleration operation quantity A (t−1). Firstly in the determination process of the control mode, the control mode determining portion 81 determines whether or not the normal drive mode is set as the current control mode (step S11). In the case where the normal drive mode is set as the control mode (Yes in step S11), the control mode determining portion 81 obtains the acceleration operation quantity A (t) from the acceleration sensor 91 (step S12). Then, the control mode determining portion 81 calculates the time derivative value A' of the acceleration operation quantity (step S13). More specifically, the control mode determining portion 81 calculates the time derivative value A' of the acceleration operation quantity on the basis of the following formula: A'=A(t)−A(t−1). Furthermore, in a case where the calculated time derivative value A' of the acceleration operation quantity is equal to or greater than a predetermined threshold value TH (Yes in step S14), the acceleration drive mode is set as the control mode (step S15).

On the other hand, in a case where the time derivative value A' of the acceleration operation quantity is smaller than the predetermined threshold value (No in step S14), the control mode is maintained as the normal drive mode. Additionally, the obtained acceleration operation quantity A(t) is stored within the control mode determining portion 81 instead of the previously obtained acceleration operation quantity A (t−1).

On the other hand, in the case where the acceleration drive mode is set as the control mode (No in step S11), the control mode determining portion 81 determines whether or not a state of the deviation between the target angle and the actual relative angle of the driven-side rotating member 11 being within a predetermined range continues to be equal to or longer than a predetermined time. More specifically, the control mode determining portion 81 determines whether or not the deviation obtained from the deviation calculating portion 84 is within the predetermined range (step S16). For example, a range [−5 degrees, +5 degrees] may be used as the predetermined range. In a case where the deviation is within the predetermined range (Yes in step S16), the control mode determining portion 81 determines whether or not a deviation normal state transmit time is set (step S17). In a case where the deviation normal state transmit time is set (Yes in step S17), a difference between a time when the process in step S17 is executed and the deviation normal state transmit time (which will be hereinafter referred to as a deviation normal state duration time) is obtained (step S18). The deviation normal state transmit time refers to a point of time when the deviation falls within the predetermined range. Furthermore, an initial value of the deviation normal state transmit time is not set. On the other hand, in a case where the deviation normal state transmit time is not set (No in step S17), the time when the determination in step S17 is concluded is set as the deviation normal state transmit time (step S21).

In a case where the obtained deviation normal state duration time is equal to or longer than a predetermined time T (e.g. 500 milliseconds) (Yes in step S19), the normal drive mode is set as the control mode (step S20). In other words, in a case where the state of the deviation being within the predetermined range continues to be equal to or longer than the predetermined time, the control mode is switched from the acceleration drive mode to the normal drive mode in order to improve the fuel consumption thereafter.

On the other hand, in a case where the deviation is not within the predetermined range (No in step S16), the deviation normal state transit time is changed to "not set" (step S22).

The control mode determining portion 81 executes the above-described control every predetermined time, so that the control mode suitable to the driving condition is executable from moment to moment. The control mode determined by the control mode determining portion 81 is transmitted to the target angle determining portion 82, the duty output determining portion 85 and the pressure increasing mechanism control portion 86.

Figure 8:
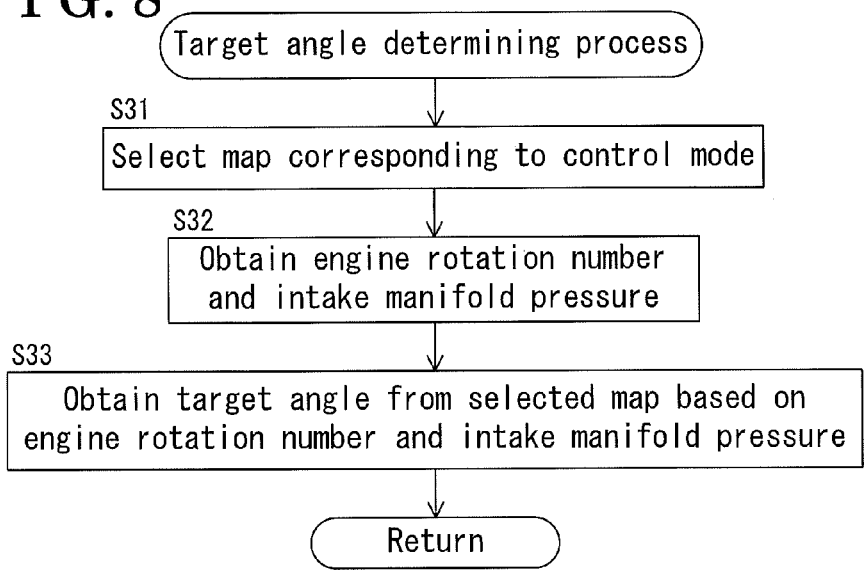
FIG. 8 is a flowchart illustrating a target angle determining process.
Figure 9:
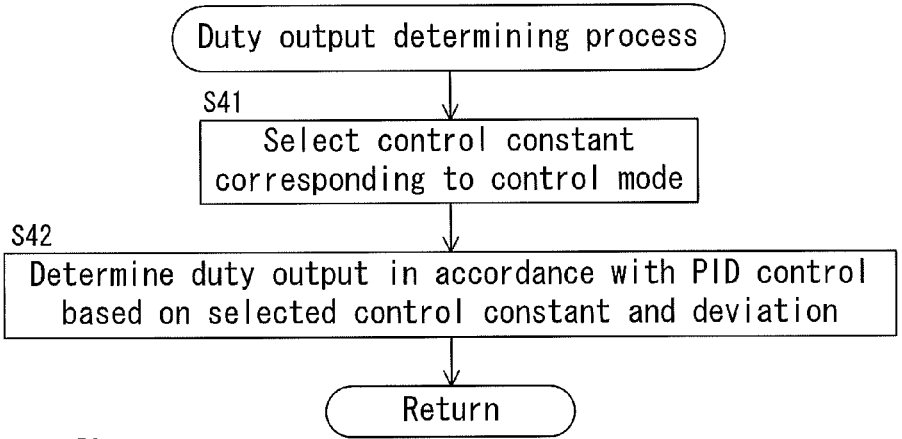
FIG. 9 is a flowchart illustrating a duty output determining process.

Once the control mode is determined by the control mode determining portion 81 in the above-described manner, the target angle determining portion 82 determines the target angle based on the control mode (step S02 in FIG. 6). More specifically, as described above, the target angle determining portion 82 stores therein the normal mode map and the acceleration mode map. In other words, the target angle is set as a function determined on the basis of the engine rotation number and the intake manifold pressure. Therefore, the target angle determining portion 82 firstly selects a map corresponding (suitable) to the control mode determined by the control mode determining portion 81 (step S31 in FIG. 8). More specifically, in the case where the normal drive mode is set as the control mode, the target angle determining portion 82 selects the normal mode map. On the other hand, in the case where the acceleration drive mode is set as the control mode, the acceleration mode map is selected.

Furthermore, the target angle is related to the engine rotation number and the intake manifold pressure in each of the normal drive map and the acceleration drive map. Therefore, the target angle determining portion 82 obtains the engine rotation number from the engine rotation number sensor 92 and the intake manifold pressure from the intake manifold pressure sensor 93 (step S32). Then, the target angle determining portion 82 obtains the target angle from the selected map on the basis of the obtained engine rotation number and the intake manifold pressure (step S33). The obtained target angle is transmitted to the deviation calculating portion 84.

Figure 11:
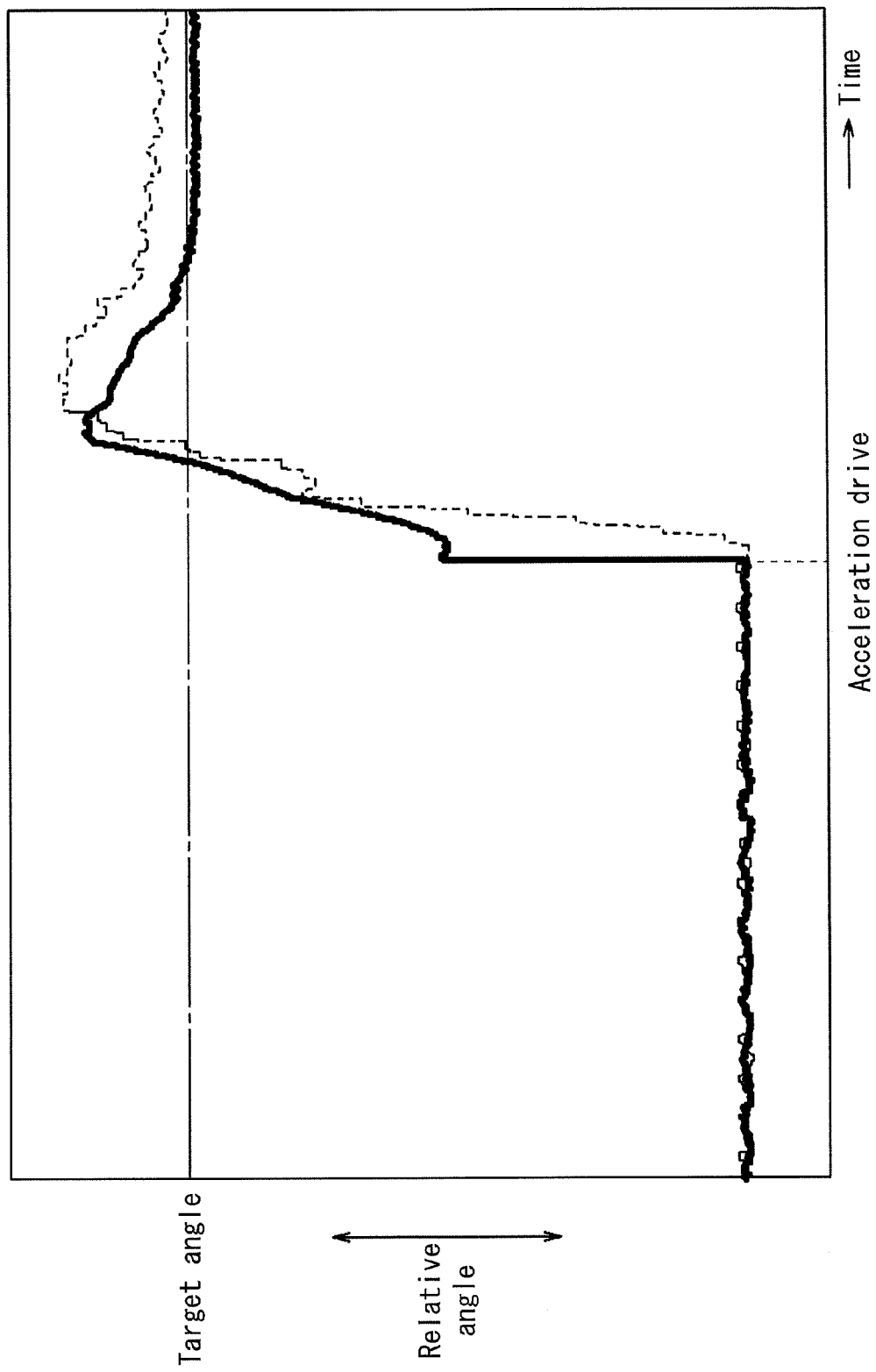
FIG. 11 is a diagram illustrating a comparison between a shift of a relative angle in a case where a map is changed in response to a control mode and a shift of the relative angle in a case where the map is not used.

Illustrated in FIG. 11 is a shift of the relative angle of the driven-side rotating member 11 in a case where the control mode is switched from the normal drive mode to the acceleration drive mode. A solid line in FIG. 11 represents the case where the map is changed in response to the control mode. On the other hand, a dotted line in FIG. 11 represents a case where a single map is used. As is evident from FIG. 11, a shifting speed and a convergence speed towards the target angle are increased in the case where the map is changed in response to the control map. In other words, an acceleration performance is enhanced in the case where the map is changed in response to the control mode, which may further result in improving the fuel consumption after the vehicle is accelerated.

On the other hand, the relative angle calculating portion 83 obtains the crank angle from the crank angle sensor 94 and the camshaft angle from the camshaft angle sensor 95, and then, the relative angle calculating portion 83 calculates the relative angle of the driven-side rotating member 11 (step S03). The calculated relative angle is transmitted to the deviation calculating portion 84.

After the deviation calculating portion 84 obtains the target angle and the relative angle, the deviation calculating portion 84 calculates a displacement in the relative angle of the actual relative angle of the driven-side rotating member 11 relative to the target angle, in other words, the deviation between the actual relative angle of the driven-side rotating member 11 and the target angle is calculated (step S04). More specifically, a calculation of a following formula is executed: (deviation)=(target angle)−(relative angle). The calculated deviation is transmitted to the control mode determining portion 81, the duty output determining portion 85 and the pressure increasing mechanism control portion 86. As described above, the control mode determining portion 81 determines the switch of the control mode from the acceleration drive mode to the normal drive mode on the basis of the deviation.

After the duty output determining portion 85 obtains the control mode and the deviation, the duty output determining portion 85 determines the duty output relative to the first control valve 74 on the basis of the control mode and the deviation (step S05). More specifically, the following process is executed by the duty output determining portion 85.

In this embodiment, the duty output determining portion 85 determines the duty output in accordance with the PID control. Generally, the PID control obtains the output on the basis of the following formula: (duty output)=(control constant)*(deviation)+(control constant)*(integrated value of deviation)+(control constant)*(derivative value of deviation). In this embodiment, the control portion 8 memorizes therein two different control modes, so that the map for obtaining the target angle is changed in response to the control mode. Furthermore, in this embodiment, the pressure increasing mechanism 100 is configured so as to be actuated in response to the control mode. Therefore, in this embodiment, an actuation (an operation) of an entire system of the valve timing control apparatus greatly differs depending on the control mode. In this case, a single control constant may be used for the PID control without considering the control mode. However, using the single control constant for the PID control may not always appropriate in view of convergence of the output. Therefore, in this embodiment, the duty output determining portion 85 stores therein the control constants corresponding to the control modes, so that the duty output determining portion 85 selects the control constant suitable for the selected control mode and executes the PID control on the basis of the selected control constant (step S41).

As described above, the deviations obtained from moment to moment are inputted into the duty output determining portion 85. Therefore, the duty output determining portion 85 determines the duty outputs from moment to moment on the basis of the obtained deviations (step S42).

Figure 10:
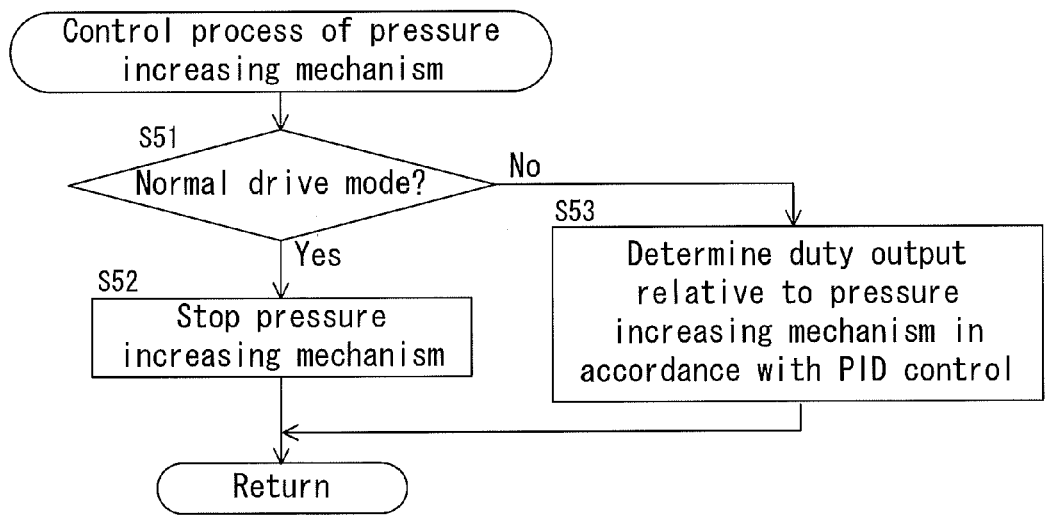
FIG. 10 is a flowchart illustrating a control process of a pressure increasing mechanism.

The pressure increasing mechanism control portion 86 controls the pressure increasing mechanism 100 on the basis of the obtained control mode and the deviation (step S06). More specifically, a process illustrated in a flowchart in FIG. 10 is executed by the pressure increasing mechanism control portion 86.

The pressure increasing mechanism control portion 86 determines whether or not the current control mode is set to the normal drive mode (step S51). In the case where the normal drive mode is set as the current control mode (Yes in step S51), the pressure increasing mechanism control portion 86 stops the pressure increasing mechanism 100 (step S52). Accordingly, unnecessary fuel consumption while the normal control mode is set may be avoided.

On the other hand, in the case where the normal drive mode is not set as the current drive mode, in other words, in the case where the acceleration drive mode is set as the current control mode (No in step S51), the pressure increasing mechanism control portion 86 determines the duty output relative to the pressure increasing mechanism 100 in accordance with the PID control on the basis of the deviation (step S53).

The pressure increasing mechanism 100 is actuated in response to the control signal outputted from the pressure increasing mechanism control portion 86. More specifically, in a case where a stop signal (e.g. duty output=zero percent (0%)) is transmitted to the pressure increasing mechanism 100 from the pressure increasing mechanism control portion 86, the pressure increasing mechanism 100 stops increasing the pressure of the engine oil. Therefore, the hydraulic pressure generated by the second pump 72 is transmitted to the first control valve 74. On the other hand, in a case where control signal other than the stop signal (e.g. duty output greater than zero percent (0%)) is transmitted to the pressure increasing mechanism 100 from the pressure increasing mechanism control portion 86, the pressure increasing mechanism 100 generates the hydraulic pressure in response to the control signal. The generated hydraulic pressure is transmitted to the first control valve 74.

Figure 12:
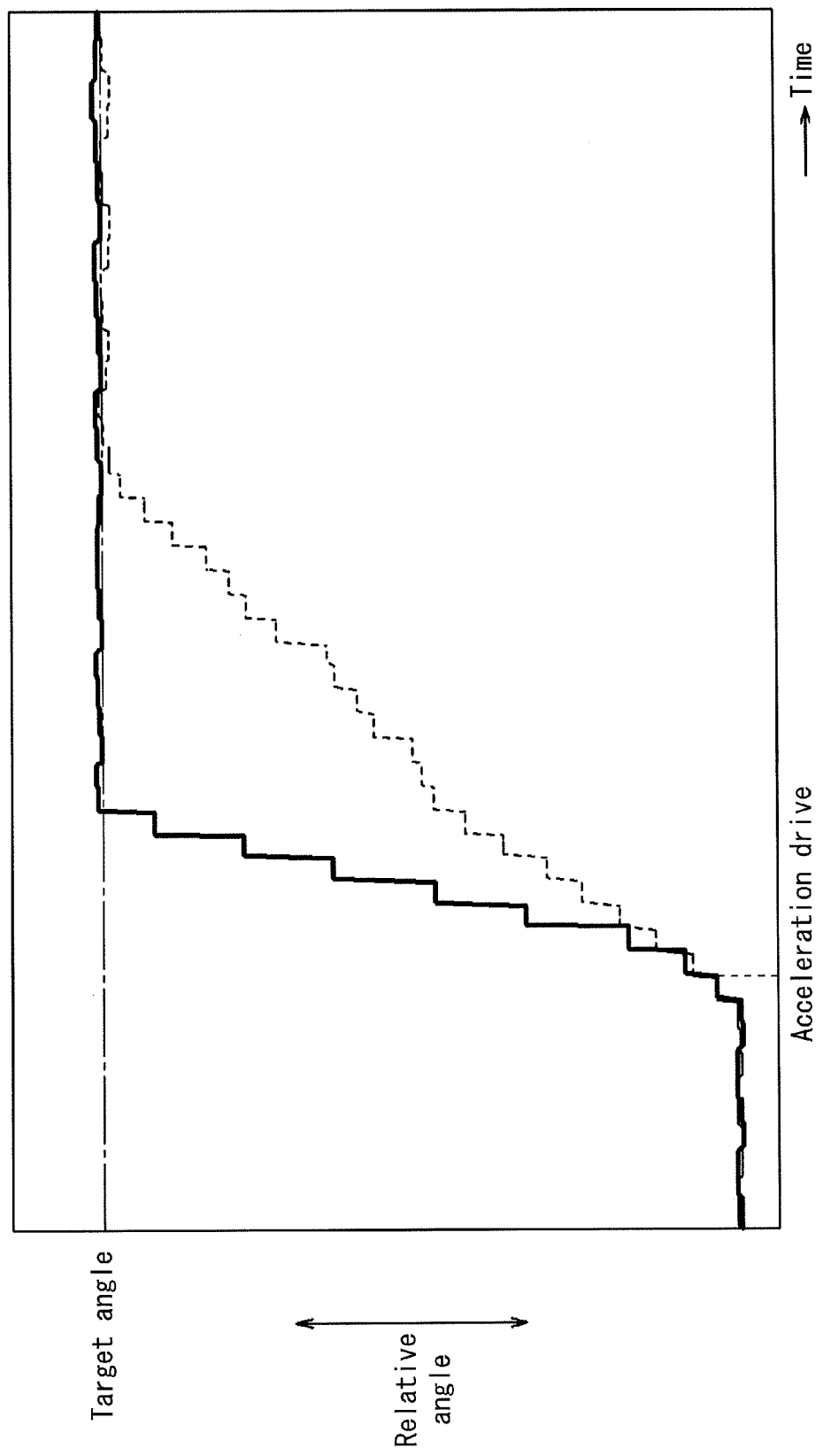
FIG. 12 is a diagram illustrating a comparison between a shift of the relative angle with the pressure increasing mechanism and a shift of the relative angle without the pressure increasing mechanism.

Illustrated in FIG. 12 is a diagram representing a relationship between time and the relative angle in the case where the relative angle of the driven-side rotating member 11 is shifted to the target angle. A solid line in FIG. 12 represents a case where the pressure increasing mechanism 100 is actuated while the relative angle of the driven-side rotating member 11 is shifted to the target angle. On the other hand, a dotted line in FIG. 12 represents a case where the pressure increasing mechanism 100 is not actuated (is stopped) while the relative angle of the driven-side rotating member 11 is shifted to the target angle. As is evident from FIG. 12, a responsiveness of the driven-side rotating member 11 increases in the case where the pressure increasing mechanism 100 is used, which further results in promptly shifting the relative angle of the driven-side rotating member 11 to the target angle.

Figure 13:
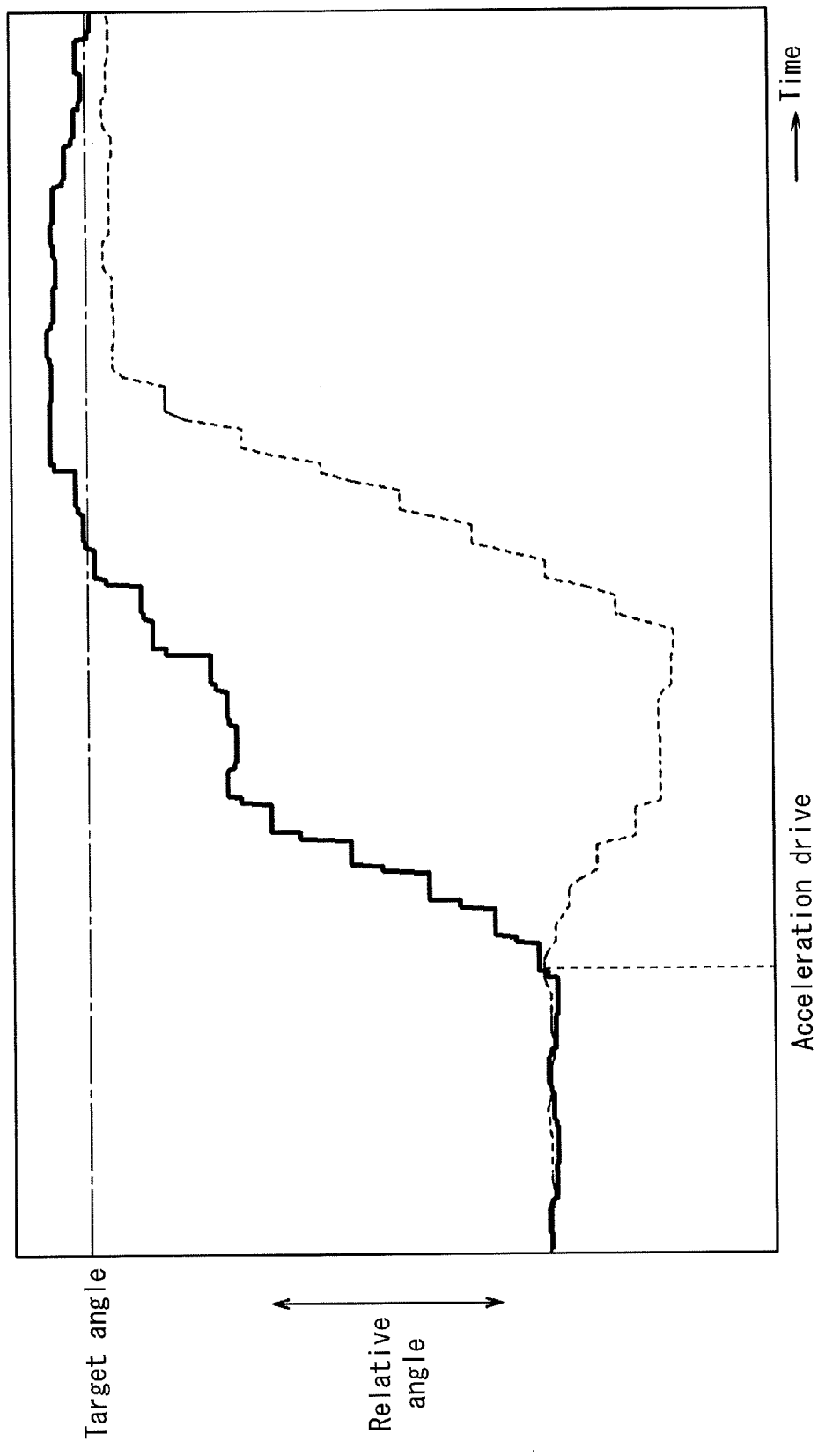
FIG. 13 is a diagram illustrating differences of shift of the relative angle between the valve timing control apparatus according to the embodiment and a known valve timing control apparatus.

Illustrated in FIG. 13 is diagram comparing the case where the relative angle of the driven-side rotating member 11 of the valve timing control apparatus according to this embodiment is shifted when the driving condition is shifted from the normal drive to the acceleration drive and a case where a relative angle of a driven-side rotating member of a known valve timing control apparatus is shifted when a driving condition is shifted from a normal drive to an acceleration drive. A solid line in FIG. 13 represents the relative angle formed by the valve timing control apparatus according to this embodiment. On the other hand, a dotted line in FIG. 13 represents a relative angle formed by the known valve timing control apparatus. As is evident from FIG. 13, in the case of the valve timing control apparatus according to the embodiment, the responsiveness of the driven-side rotating member 11 increases, so that the relative angle of the driven-side rotating member 11 promptly shifts to the target angle when comparing to the known valve timing control apparatus. Furthermore, because the relative angle of the driven-side rotating member 11 of the valve timing control apparatus according to the embodiment promptly shifts towards the advanced angle phase, the torque increases, so that a high acceleration performance may be achieved.

Other Embodiments

In the above-described embodiment, the shift of the control mode to the normal drive mode in the case where the state of the deviation between the target angle and the relative angle of the driven-side rotating member 11 being equal to or lower than the predetermined threshold value continues to be equal to or longer then the predetermined time triggers the stop of the pressure increasing mechanism 100. However, the valve timing control apparatus according to the embodiment may be modified so that the condition determination is executed by the pressure increasing mechanism control portion 86, so that the pressure increasing mechanism control portion 86 stops the pressure increasing mechanism 100 in the above-mentioned case. In this case, the output from the deviation calculating portion 84 does not need to be inputted into the control mode determining portion 81.

In the above-described embodiment, the pressure increasing mechanism control portion 86 is configured so as to control the pressure increasing mechanism 100 based on the PID control in the case where the acceleration drive mode is set as the control mode. However, the valve timing control apparatus according to the embodiment may be modified so that the pressure increasing mechanism control portion 86 executes a control of actuating the pressure increasing mechanism 100 without using the PID control in the case where the acceleration drive mode is set as the control mode. In other words, the pressure increasing mechanism control portion 86 may be configured so as to actuate the pressure increasing mechanism 100 in the case where the acceleration drive mode is set as the control mode, and so as to stop actuating the pressure increasing mechanism 100 in the case where the normal drive mode is set as the control mode. The above-mentioned control may be suitable to a valve timing control apparatus, which is configured so that the duty control is not executable relative to the pressure increasing mechanism 100.

In the above-described embodiment, the shift of the control mode to the normal drive mode in the case where the deviation normal state duration time is equal to or longer than the predetermined time triggers the stop of the pressure increasing mechanism 100. However, the valve timing control apparatus may be modified so as to execute a control of stopping the pressure increasing mechanism 100 without changing the control mode in the case where the deviation normal state duration time becomes equal to or longer than the predetermined time.

The configuration of the valve timing control apparatus according to the embodiment and modified embodiments may be adapted to any valve timing control apparatus having a driving-side rotating member synchronously rotated relative to a crankshaft of an internal combustion engine, a driven-side rotating member arranged relative in a coaxial manner relative to the driving-side rotating member and synchronously rotated together with the camshaft for opening/closing a valve of the internal combustion engine, a hydraulic pressure chamber, which is defined by the driving-side rotating member and the driven-side rotating member and which is divided into a retarded angle chamber and an advanced angle chamber by means of a parting portion provided at least one of the driving-side rotating member and the driven-side rotating member, and a fluid control mechanism for controlling a supply of an operation fluid to the fluid pressure chamber from a pump that supplies the operation fluid and a discharge of the operation fluid from the fluid pressure chamber.

According to the embodiment, the valve timing control apparatus includes the driving-side rotating member 12 synchronously rotated relative to the crankshaft of the internal combustion engine, the driven-side rotating member 11 arranged in the coaxial manner relative to the driving-side rotating member 12 and synchronously rotated together with the camshaft 10 for opening and closing the valve of the internal combustion engine, the spaces 2 defined by the driving-side rotating member 12 and the driven-side rotating member 11 and each of which is divided into the retarded angle chamber 2A and the advanced angle chamber 2B by means of the vane 13 provided at least one of the driving-side rotating member 12 and the driven-side rotating member 11, the angle detecting portion (the crankshaft angle sensor 94 and the camshaft angle sensor 95) detecting the relative angle, which corresponds to the relative phase of the driven-side rotating member 11 relative to the driving-side rotating member 12, the first control valve 74 controlling the supply of the engine oil from the first pump 71, which supplies engine oil, to the spaces 2 and the discharge of the engine oil from the spaces 2, the acceleration sensor 91 detecting the acceleration operation quantity, which corresponds to the operation quantity applied to the acceleration pedal, and the control portion 8 setting either one of the normal drive mode and the acceleration drive mode as the control mode relative to the first control valve 74 on the basis of the acceleration operation quantity, and controlling the first control valve 74 so that the relative angle corresponds to the target angle, which is set as the target value of the relative angle determined on the basis of the acceleration operation quantity in the set control mode.

Furthermore, according to the embodiment, the valve timing control apparatus includes the driving-side rotating member 12 synchronously rotated relative to the crankshaft C of the engine E, the driven-side rotating member 11 arranged in the coaxial manner relative to the driving-side rotating member 12 and synchronously rotated together with the camshaft 10 for opening and closing the valve of the engine E, the angle detecting portion (94, 95) detecting the relative angle, which corresponds to the relative phase of the driven-side rotating member 11 relative to the driving-side rotating member 12, the acceleration sensor 91 detecting the acceleration operation quantity, which corresponds to the operation quantity applied to the acceleration pedal, and the control portion 8 setting either one of the normal drive mode and the acceleration drive mode, each of which store therein different control information, as the control mode based on which the relative angle is controlled in response to the acceleration operation quantity, and shifting the relative angle on the basis of the control information corresponding to the either one of the normal drive mode and the acceleration drive mode, which is set as the control mode.

Accordingly, the driver's intension whether the driver wishes the normal drive or the acceleration drive is determined on the basis of the acceleration operation quantity, so that the control mode corresponding to the determination result is determined. Furthermore, the control portion 8 executes the control of the first control valve 74 in response to the determined control mode. Accordingly, the driven-side rotating member 11 may be shifted to the relative angle suitable to the drive mode desired by the driver. For example, the relative angle by which the fuel consumption is improved may be set as the target angle in the case where the normal drive is selected. On the other hand, in the case where the acceleration drive is selected, the relative angle by which a prompt acceleration is achieved may be set as the target angle. Accordingly, a drive by which the fuel consumption is enhanced may be achieved while the vehicle is driven under the normal drive condition. On the other hand, in the case where the driver wishes to accelerate the vehicle speed, the prompt acceleration may be achieved.

According to the embodiment, the control portion 8 includes the normal mode map, which defines the relationship between the acceleration operation quantity and the target angle in the normal drive mode, and the acceleration mode map, which defines the relationship between the acceleration operation quantity and the target angle in the acceleration drive mode, determines either one of the normal mode map and the acceleration mode map to be used on the basis of the set control mode and determines the target angle on the basis of the selected map.

Accordingly, because the target angle is determined on the basis of the map set in response to the control mode, a prompt phase control of the driven-side rotating member 11 may be executed in response to the acceleration operation by the driver. As a result, the fuel consumption of the engine E may be surely improved, and a driving feeling may be surely improved.

According to the embodiment, the control portion 8 calculates the time derivative value of the acceleration operation quantity and sets the acceleration drive mode as the control mode in the case where the time derivative value of the acceleration operation quantity exceeds the predetermined value.

The acceleration pedal directly reflects the operation of the driver thereto. Therefore, the time derivative value of the acceleration operation quantity may be considered as an operation intention of the driver. Accordingly, the control mode properly and appropriately reflecting the driving intention of the driver may be determined, so that the driver may feel a better driving performance.

According to the embodiment, the control portion 8 obtains the deviation between the target angle and the actual relative angle of the driven-side rotating member 11, so that the control portion 8 sets the normal drive mode as the control mode in the case where the state of the deviation being within the predetermined range continues to be equal to or longer than a predetermined time.

According to the embodiment, the valve timing control apparatus further includes the pressure increasing mechanism 100, which is configured so as to increase the pressure of the engine oil and apply the pressure increased engine oil to the spaces 2 and which is arranged in parallel to the passage establishing the communication between the first pump 71 and the spaces 2.

Accordingly, the engine oil is also supplied to the spaces 2 from the pressure increasing mechanism 100 in addition to the supply of the engine oil to the spaces 2 from the first pump 71. Therefore, the pressure of the engine oil may be increased at a timing necessitated by the driver, so that a smooth acceleration operation of the engine E may be achieved.

According to the embodiment, the control portion 8 executes the PID control to the operation quantity of the pressure increasing mechanism 100 in response to the deviation between the target angle and the actual relative angle of the driven-side rotating member 11.

Accordingly, because the PID control is executed relative to the operation quantity of the pressure increasing mechanism 100, increase and decrease of the pressure of the engine oil supplied to the spaces 2 may be continuously changed in response to the acceleration operation by the driver. As a result, the acceleration of the engine E may be very smoothly performed, so that the smooth and appropriate driving feeling (the driving performance) may be provided to the driver.

According to the embodiment, the control portion 8 calculates the deviation between the target angle and the actual relative angle of the driven-side rotating member 11 and controls the pressure increasing mechanism 100 to be stopped in the case where the state of the deviation being within the predetermined time continues to be equal to or longer than the predetermined time.

Accordingly, because the stopping condition of the pressure increasing mechanism 100 is set, the supply of the engine oil to the spaces 2 may be gradually reduced. In other words, an operation after the shift of the relative phase of the driven-side rotating member 11 is completed may be smoothly performed, so that an overshoot of the phase control may be avoided. Accordingly, the engine E provided with the valve timing control apparatus according to the embodiment may perform a smooth shift from the acceleration drive to the normal drive.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A valve timing control apparatus comprising:
a driving-side rotating member configured to synchronously rotate relative to a crankshaft of an internal combustion engine;
a driven-side rotating member arranged in a coaxial manner relative to the driving-side rotating member and configured to synchronously rotate together with a camshaft for opening and closing a valve of the internal combustion engine;
a fluid pressure chamber defined by the driving-side rotating member and the driven-side rotating member and divided into a retarded angle chamber and an advanced angle chamber by means of a parting portion provided at at least one of the driving-side rotating member and the driven-side rotating member;
an angle detecting portion configured to detect a relative angle, which corresponds to a relative phase of the driven-side rotating member relative to the driving-side rotating member;
a fluid control mechanism configured to control a supply of an operation fluid from a pump, which supplies the operation fluid, to the fluid pressure chamber and a discharge of the operation oil from the fluid pressure chamber;
an acceleration operation quantity detecting mechanism configured to detect an acceleration operation quantity, which corresponds to an operation quantity applied to an acceleration pedal;
an engine rotation number sensor configured to measure a rotation number of the engine;
an air amount sensor configured to measure an amount of an intake or exhausted air; and
a control portion configured to set either one of a normal drive mode and an acceleration drive mode as a control mode relative to the fluid control mechanism on the basis of the acceleration operation quantity, and configured to control the fluid control mechanism so that the relative angle corresponds to a target angle, which is set as a target value of the relative angle determined on the basis of the acceleration operation quantity in the set control mode, wherein
the control portion includes a relative angle calculating portion configured to calculate the relative angle and a deviation calculating portion configured to calculate a deviation between the target angle and the relative angle, and the control portion is configured to switch from the acceleration drive mode to the normal drive mode based on a determination that the state of the deviation stays within a predetermined range for an amount of time equal to or longer than a predetermined amount of time while the acceleration drive mode is set as the control mode,
the control portion includes a normal mode map, which defines a relationship between the acceleration operation quantity and the target angle in the normal drive mode, and an acceleration mode map, which defines a relationship between the acceleration operation quantity and the target angle in the acceleration drive mode, and is configured to determine either one of the normal mode map and the acceleration mode map to be used on the basis of the set control mode and to determine the target angle on the basis of the selected map, the map defines a relationship between the rotation number of the engine, the amount of the intake or exhausted air and the target angle, and the control portion includes a target angle determining portion configured to obtain the engine rotation number from the engine rotation number sensor and the amount of the intake or exhausted air from the air amount sensor and to determine the target angle from the selected map on the basis of the obtained engine rotation number and the obtained amount of the intake or exhausted air.

2. The valve timing control apparatus according to claim 1, wherein the control portion is configured to calculate a time derivative value of the acceleration operation quantity and to set the acceleration drive mode as the control mode in a case where the time derivative value of the acceleration operation quantity exceeds a predetermined value.

3. The valve timing control apparatus according to claim 1 further comprising a pressure increasing mechanism, which is configured so as to increase a pressure of the operation fluid and apply the pressure increased operation fluid to the fluid pressure chamber and which is arranged in parallel to a passage establishing a communication between the pump and the fluid pressure chamber.

4. The valve timing control apparatus according to claim 3, wherein the control portion includes a pressure increasing mechanism control portion configured to execute a PID control to an operation quantity of the pressure increasing mechanism in response to the deviation calculated by the deviation calculating portion.

5. The valve timing control apparatus according to claim 3, wherein the control portion includes a pressure increasing mechanism control portion configured to control the pressure increasing mechanism to be stopped based on a determination that a state of the deviation being within a predetermined time continues to be equal to or longer than a predetermined time.

6. The valve timing control apparatus according to claim 4, wherein the pressure increasing mechanism control portion is configured to control the pressure increasing mechanism to be stopped based on a determination that a state of the deviation being within a predetermined time continues to be equal to or longer than a predetermined time.

7. The valve timing control apparatus according to claim 1, wherein
the air amount sensor is an intake manifold pressure sensor configured to measure an air pressure of the intake manifold or a sensor configured to measure a flow of the air flowing within the intake manifold.

8. The valve timing control apparatus according to claim 1, wherein
the normal mode map sets a target angle improving a fuel consumption and the acceleration mode map sets a target angle improving a torque.

9. The valve timing control apparatus according to claim 1 further comprising a pressure increasing mechanism, which is configured so as to increase pressure of the operation fluid and apply the pressure increased operation fluid to the fluid pressure chamber and which is arranged in parallel to a passage establishing a communication between the pump and the fluid pressure chamber, wherein
the control portion includes a pressure increasing mechanism control portion configured to control the pressure increasing mechanism so as to be actuated or stopped in response to the control mode and a duty output determining portion storing therein a normal mode control constant used in the case of the normal drive mode and an acceleration mode control constant used in the case of the acceleration drive mode, and
the duty output determining portion is configured to select the control constant in response to the selected control mode, determine the duty output relative to the fluid control mechanism on the basis of the selected control constant and the deviation, apply the determined duty output to the fluid control mechanism and execute a PID control to an operation quantity of the fluid control mechanism.

* * * * *